United States Patent [19]
Mezger et al.

[11] Patent Number: 4,970,860
[45] Date of Patent: Nov. 20, 1990

[54] FLUID COUPLING FOR HELICOPTER PROPELLER

[75] Inventors: Hans Mezger, Freiberg; Dieter Zaremba, Muehlacker, both of Fed. Rep. of Germany

[73] Assignee: Porsche AG

[21] Appl. No.: 286,077

[22] Filed: Dec. 19, 1988

[30] Foreign Application Priority Data

Dec. 19, 1987 [DE] Fed. Rep. of Germany ....... 3743292

[51] Int. Cl.⁵ .................... B64D 35/00; F16D 33/06; B64C 27/14
[52] U.S. Cl. ........................ 60/337; 60/339; 60/357; 60/358
[58] Field of Search ................ 60/336–337, 60/339, 347, 352, 357–358, 403; 416/197 C

[56] References Cited

U.S. PATENT DOCUMENTS

| | | | |
|---|---|---|---|
| 2,186,748 | 1/1940 | Berger | 60/339 |
| 2,270,536 | 1/1942 | Lenning | 60/337 X |
| 2,416,948 | 3/1947 | Pavlecka | 60/339 X |
| 2,473,809 | 6/1949 | Miller | 60/357 |
| 2,644,535 | 7/1953 | Koup et al. | 60/357 X |
| 3,053,051 | 9/1962 | Kelly | 60/359 X |
| 3,164,961 | 1/1965 | Schröder | 60/337 X |
| 3,955,365 | 5/1976 | Arao | 60/358 X |
| 4,376,370 | 3/1983 | Kinugasa et al. | 60/339 X |

FOREIGN PATENT DOCUMENTS

| | | |
|---|---|---|
| 610491 | 2/1935 | German Democratic Rep. . |
| 1052765 | 11/1983 | U.S.S.R. ............... 60/337 |
| 448560 | 12/1935 | United Kingdom . |
| 478041 | 1/1938 | United Kingdom ........ 60/337 |
| 856975 | 12/1960 | United Kingdom . |
| 1487752 | 10/1977 | United Kingdom . |

Primary Examiner—Edward K. Look
Assistant Examiner—George Kapsalas
Attorney, Agent, or Firm—Evenson, Wands, Edwards, Lenahan & McKeown

[57] ABSTRACT

A disengageable connection between an internal combustion engine and a propeller which serves for the drive of a gyroplane. The disengageable connection is a fluid coupling which includes a controllable oil circulatory system. The fluid coupling is supplied with oil by way of the oil circulatory system during the operation of the internal combustion engine. By contrast, the oil escapes out of the fluid coupling when the propeller operates under auto-rotation.

12 Claims, 1 Drawing Sheet

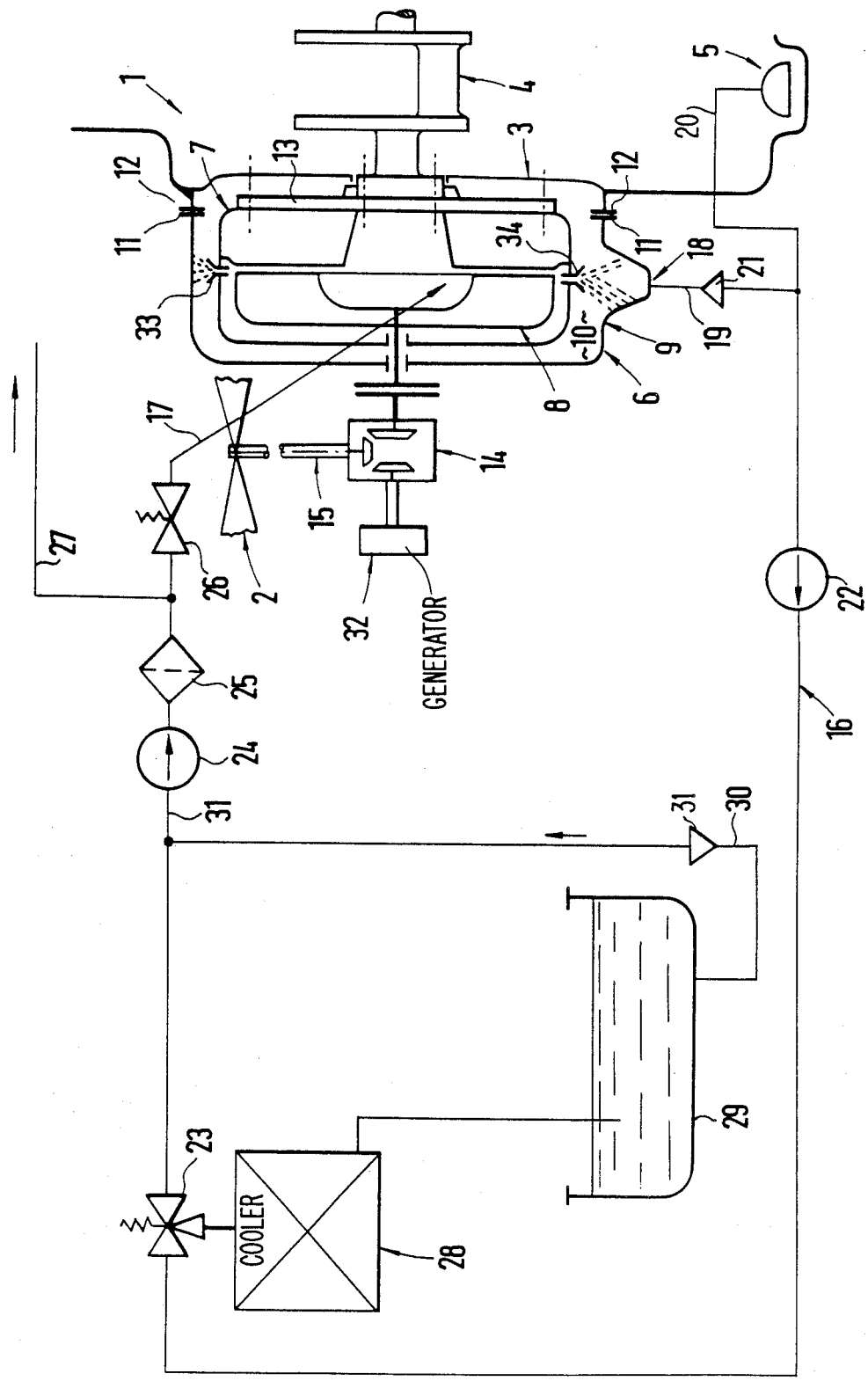

FLUID COUPLING FOR HELICOPTER PROPELLER

BACKGROUND OF THE INVENTION

The present invention relates to a clutch between an internal combustion engine and a propeller, preferably a helicopter propeller which serves for the drive of a helicopter.

It is known (Meyer's Encyclopedia "Technik und exakte Naturwissenschaften" 1969, page 622) to provide a friction clutch between an internal combustion engine and a helicopter propeller of a gyroplane of the helicopter-type construction.

SUMMARY OF THE INVENTION

It is the object of the present invention to so construct the clutch which connects the internal combustion engine and the helicopter propeller of a helicopter that it is vibration-damping and wear-resistant combined with good coupling function. However, this clutch should also satisfy the requirements necessary during auto-rotation of the helicopter propeller.

The underlying problems are solved according to the present invention in that the clutch is a fluid coupling which includes a controllable oil circulation in such a manner that during the operation of the internal combustion engine the fluid coupling is supplied with oil but during auto-rotation of the helicopter propeller the oil escapes out of the fluid coupling.

The advantages principally achieved with the present invention reside in that the fluid coupling operates wear-free and transmits the occurring forces between the internal combustion engine and the helicopter propeller softly. This fluid coupling, which is also referred to as dynamic fluid coupling, also acts vibration-damping.

Therebeyond, the torque transmission between pump wheel and turbine wheel is far-reachingly interrupted within shortest period of time in the operating range of auto-rotation of the helicopter propeller—its rotation can be traced back exclusively to aerodynamic moments—which results, for example, upon undesired standstill of the internal combustion engine. Stated differently, the oil escapes rapidly out of the fluid coupling and the rotary movement of the helicopter propeller is assured in the sense of the auto-rotation.

BRIEF DESCRIPTION OF THE DRAWING

These and other objects, features and advantages of the present invention will become more apparent from the following description when taken in connection with the accompanying drawing which shows, for purposes of illustration only, one embodiment in accordance with the present invention, and wherein:

The single figure is a schematic view of a coupling between an internal combustion engine and helicopter propeller of a helicopter in accordance with the present invention.

DETAILED DESCRIPTION OF THE DRAWING

Referring now to the single figure of the drawing, an internal combustion engine generally designated by reference numeral 1 of the reciprocating piston-type construction serves for the drive of a helicopter propeller 2 of a gyroplane which is also referred to as helicopter. The internal combustion engine includes a crankcase 3, a crankshaft 4 and an oil sump 5. A fluid coupling generally designated by reference numeral 6 is provided between the internal combustion engine 1 and the helicopter propeller 2 which is formed by a pump wheel 7 and a turbine wheel 8. The pump wheel 7 and the turbine wheel 8 are accommodated in a housing 9. The housing 9 delimits a space 10 and is connected with the crankcase 3 by way of flanges 11 and 12. The pump wheel 7 (driving wheel) is connected with the crankshaft 4 by means of a flywheel 13 whereas the turbine wheel 8 (driven wheel) is connected with the helicopter propeller 2 having a shaft 15 with interconnection of a distributor gear 14.

An oil circulatory system is generally designated by reference numeral 16, by means of which oil is supplied to the fluid coupling 6 by way of the line 17. The oil leaving the fluid coupling 6 exits at 18 where the line 19 extends which is connected by way of the line 20 with the lubricating oil circulation of the internal combustion engine, i.e., with the oil sump 5. A check valve 21, a suction pump 22, a thermostatic valve 23, a feed pump 24, a filter 25 and a coupling valve 26 are connected into the oil circulatory system 16. A return line 27 leads to the lubricating oil circulatory system of the internal combustion engine 1. The thermostatic valve 23 valves heated-up oil to an oil cooler 28, to the output of which is connected an oil tank or reservoir 29. A line 30 which is provided with a further check valve 31, conducts the oil from the oil reservoir 29 again into the inlet of the line 17.

The suction pump 22 is connected with an electric generator 32 which is operatively connected with the helicopter propeller 2.

Nozzles 33 and 34 are provided at the pump wheel 7 which discharge into the space 10. After the start of the internal combustion engine 1, the circulation of the circulatory system 16 is set into operation. After reaching the operating temperature, the internal combustion engine 1 is accelerated to its permanent rotational speed, as a result of which a gradual adaptation of the rotational speed of the turbine wheel 8 to the rotational speed of the pump wheel 7 takes place; torque is now transmitted to the helicopter propeller 2.

In case of malfunctioning of the internal combustion engine 1, for example, the crankshaft 4 is stationary, then also the pump wheel 7 will stand still. The helicopter propeller 2 which has a high inertia moment, continues to rotate; the auto-rotation, caused by aerodynamic moments, commences. The oil enters rapidly into the space 10, accelerated by the turbine wheel 7, and the fluid coupling 6 is emptied whereby the oil is sucked off by the suction pump 22, which is now operated with the current of the generator 32, into the oil circulatory system 17; it is fed into the oil tank 29. In this phase, the valve 26 is closed. The helicopter propeller 2 is thereby decoupled from the internal combustion engine 1 and the helicopter lands by auto-rotation.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A disengageable connection between an internal combustion engine and a propeller, comprising fluid coupling means which includes a controllable oil circulatory means, and control means for supplying the fluid coupling means with oil during the operation of the internal combustion engine while enabling escape of oil out of the fluid coupling means during auto-rotation of the propeller, including suction pump means operatively connected to an electrical generator coupled with the propeller.

2. An arrangement according to claim 1, further comprising an oil tank, an oil cooler and a feed pump interconnected into the oil circulatory means.

3. An arrangement according to claim 1, wherein the fluid coupling means includes pump wheel means and turbine wheel means accommodated in a housing means, the pump wheel means having at least one nozzle means which discharges into the space delimited by the housing means.

4. An arrangement according to claim 3, wherein the pump wheel means is connected with the crankshaft of the internal combustion engine by means of a flywheel.

5. An arrangement according to claim 3, wherein the housing means is connected with a crankcase of the internal combustion engine.

6. An arrangement according to claim 5, wherein the housing means and the crankcase are connected with each other by way of flange means.

7. An arrangement according to claim 1, wherein the coupling means is between an internal combustion engine and a helicopter propeller which serves for the propulsion of a gyroplane.

8. An arrangement according to claim 7, wherein the fluid coupling means includes pump wheel means and turbine wheel means accommodated in a housing means, the pump wheel means having at least one nozzle means which discharges into the space delimited by the housing means.

9. An arrangement according to claim 8, further comprising an oil tank, an oil cooper and a feed pump interconnected into the oil circulatory means.

10. An arrangement according to claim 8, wherein the housing means is connected with a crankcase of the internal combustion engine.

11. An arrangement according to claim 10, wherein the housing means and the crankcase are connected with each other by way of flange means.

12. An arrangement according to claim 10, wherein the pump wheel means is connected with the crankshaft of the internal combustion engine by means of a flywheel.

* * * * *